United States Patent
Bhaumik et al.

[15] 3,643,175
[45] Feb. 15, 1972

[54] THE USE OF MERCURY IN A CARBON MONOXIDE LASER

[72] Inventors: Mani L. Bhaumik, Pasadena; Michael M. Mann, Redondo Beach, both of Calif.

[73] Assignee: Northrop Corporation, Beverly Hills, Calif.

[22] Filed: Sept. 10, 1970

[21] Appl. No.: 71,023

[52] U.S. Cl. .......................................................331/94.5
[51] Int. Cl. .......................................................H01s 3/22
[58] Field of Search ...........................................331/94.5

[56] References Cited

UNITED STATES PATENTS

| | | |
|---|---|---|
| 3,388,314 | 6/1968 | Gould .......................... 331/94.5 X |
| 3,394,320 | 7/1968 | Medicus ........................ 331/94.5 |
| 3,411,106 | 11/1968 | Friedl .......................... 331/94.5 |
| 3,464,025 | 8/1969 | Bell ............................ 331/94.5 |

OTHER PUBLICATIONS

Clark et al., *IEEE Journal of Quantum Electronics*, Vol. QE-4, pp. 263-266, May 1968
Osgood et al., *IEEE Journal of Quantum Electronics*, Vol. QE-6 pp. 145-154, March 1970
Vogel, *Electronics*, Jan. 4, 1963, pp. 102, 104

*Primary Examiner*—Ronald L. Wibert
*Assistant Examiner*—Edward S. Bauer
*Attorney*—Sokolski & Wohlgemuth and W. M. Graham

[57] ABSTRACT

The room temperature efficiency of a carbon monoxide laser is increased by introducing mercury vapor into the gaseous discharge mixture. a further increase in efficiency in the laser is achieved when xenon is introduced into the mixture together with the mercury.

8 Claims, 4 Drawing Figures

PATENTED FEB 15 1972         3,643,175
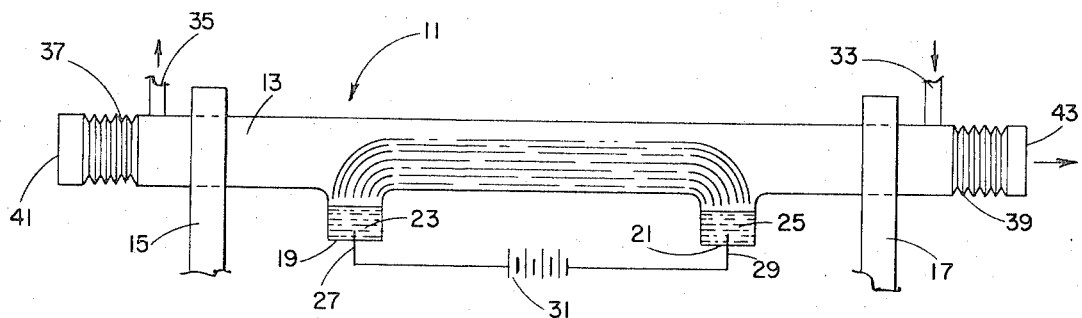
FIG. 1
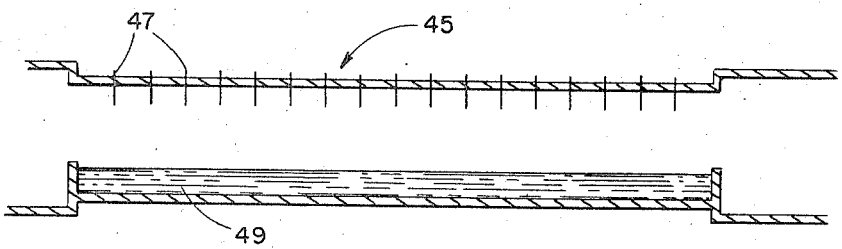
FIG. 2
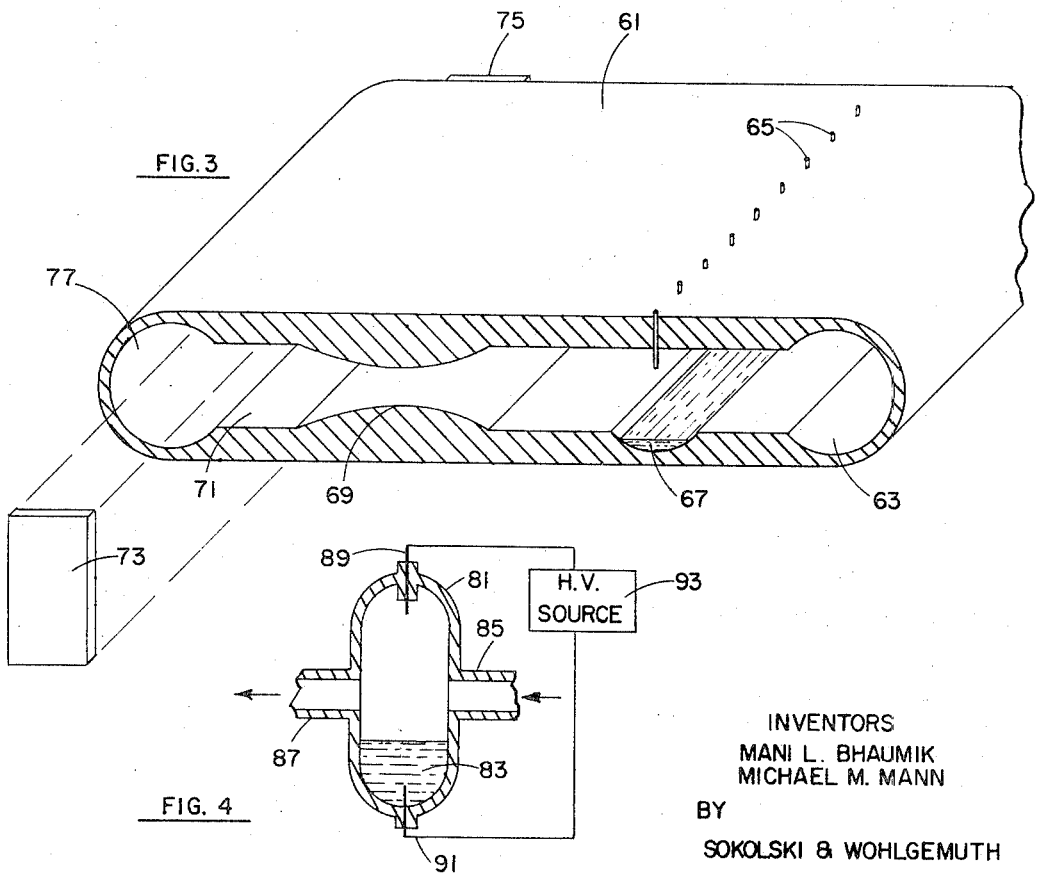
FIG. 3
FIG. 4
INVENTORS
MANI L. BHAUMIK
MICHAEL M. MANN
BY
SOKOLSKI & WOHLGEMUTH
ATTORNEYS

THE USE OF MERCURY IN A CARBON MONOXIDE LASER

BACKGROUND OF THE INVENTION

1. Field of the Invention

This invention is in the field of gaseous lasers. More particularly the invention relates to improved carbon monoxide lasers.

2. Description of the Prior Art

There is considerable interest in the development of molecular gas lasers capable of delivering high efficiency and high output powers in the infrared region. The high efficiency of molecular lasers results from the face that these lasers utilize transitions between vibrational-rotational levels of the electronic ground state giving rise to a minimum of heat loss. Since molecular lasers operate on transitions between closely spaced, vibrational-rotational levels, the laser output can be obtained in a number of lines, actually more than 100 in some cases. Of the gaseous lasers, both the $CO_2$ and the CO molecular lasers are of interest because their output wave lengths are in the atmospheric transmission windows near 10 and 5 micron wavelengths respectively. Most of the prior work and study has been done with regard to the $CO_2$ lasers. Interest in the CO laser is a more recent development in that high-efficiency and high-power operation was not achieved until cryogenic temperatures had been utilized. As a result, the mechanism of the CO laser is not fully understood. It would appear that some of the processes involved in a high-powered CO laser are different than those in the $CO_2$ laser though the gas mixtures and discharge conditions are similar in both cases.

If a CO laser is operated at room temperature, that is a temperature of 20°±5° C., there is a low-power and low-efficiency output. Thus not until it was discovered to operate the CO laser at cryogenic temperatures such as that of liquid nitrogen were high power and higher efficiencies obtained. However, the requirement for operating a CO laser at cryogenic temperatures is a severe drawback to its practical utilization. The overall system efficiency goes down because of the energy input required because of the additional power required to cool the cryogenics. Further, the use of the cryogenic material unduly complicates the handling and logistics problems of the laser. As a result the full potential of the carbon monoxide laser cannot be realized unless it is operable at room temperature with sufficient power and efficiency levels.

SUMMARY OF THE INVENTION

The herein invention comprises a method and suitable laser apparatus for the operation of a carbon monoxide laser at room temperature utilizing mercury vapor in the gas discharge. The principal constituents of the gaseous mixture in the laser are CO, $N_2$ and He. Mercury vapor is introduced into the gaseous mixture through various techniques. In one embodiment of the invention the laser is in the form of an enclosed tube having an inlet and outlet for the flowing gaseous mixture. The mercury is disposed in two separate pools to which are attached electrodes and a potential is fixed between the two pools of mercury so as to cause a vapor discharge of the mercury into the main tube where it is picked up by the gaseous mixture flow. Another embodiment of the invention, the mercury is in a pool along the base of the laser tube while a plurality of individual small electrodes are disposed above and opposite the pool with a potential established between each electrode and the pool with vapor created in the region between the electrodes and the pool so that it can be picked up by the gaseous mixture flowing therethrough. In a further embodiment of the invention, the gaseous mixture is first directed between electrodes and a pool of mercury to pick up the vapor. It then is passed through a venturi area to cool the gas and is then directed to a laser tube. One further embodiment, the gaseous mixture is directed into and passed through a high-pressure mercury discharge device where it will pick up the mercury vapor, the gas then being directed into a laser tube. It is found that the efficiency of a laser containing the mercury vapor is even further improved if the gaseous mixture has xenon added thereto. It is believed that the invention will be further understood from the following detailed description and drawings in which:

BRIEF DESCRIPTION OF THE DRAWINGS

FIG. 1 is a cross-sectional schematic representation of a first laser embodiment of this invention incorporating mercury electrodes.

FIG. 2 is a partial schematic view of a second laser embodiment of this invention.

FIG. 3 is a cross-sectional schematic representation of a third embodiment of this invention.

FIG. 4 is a cross-sectional schematic representation of a high pressure mercury discharge source to be utilized in combination with a laser as an embodiment of this invention.

Turning now to FIG. 1 there is seen a generally conventional laser tube 11 incorporating, however, means for admitting the mercury vapor. The laser tube can be comprised of a cylinder of, for example, soft glass 13 supported by end plates 15 and 17. The tube 11 can be formed therein wells 19 and 21 spatially displaced from each other to contain pools of mercury 23 and 25 respectively. Electrodes 27 and 29 are embedded in the mercury pools 23 and 25 respectively. The electrodes are in turn connected to a high-voltage power source 31. A gaseous mixture can be admitted to the tube 13 through an inlet 33 at one end thereof while at a second end an exit line 35 can be connected to a vacuum pump. At each end of the tube 13 are affixed flexible bellows 37. Affixed to one bellows 37 is a total reflector 41 while affixed to the opposite bellows 39 is a partial reflector 43 which allows the laser beam to be extracted from the device. To demonstrate the principle of the herein invention the laser arrangement of FIG. 1 was utilized, when the laser tube 13 was made of a soft glass having a 2-centimeter inner diameter. The separation between the electrodes 27 and 29 was 124 centimeters. The electrode wells 23 and 25 were filled with mercury to within 1 centimeter of the laser tube wall. The exposed surface of the mercury was 1.5 cm.² The central 110 centimeters of the tube was immersed in a temperature control bath with which the wall temperature could be maintained at any selected temperature between 77° K. and ambient by controlling the flow of cold nitrogen gas through a bath containing a mixture of equal parts of 2-methyl-butane and isohexane. The wall temperature was monitored in several places by thermocouples and thermometers. The resonator of the laser was formed by a 10-meter total reflector 41 and a flat mirror of 95 percent reflectivity between 4.6 and 5.5 microns designated as 43. The mirrors were separated by a distance of 215 cm. A flowing mixture of carbon monoxide, nitrogen, helium and oxygen was utilized.

The spectrum of the laser at 77° K. consisting of seven vibrational bands ranging from $v=13 \rightarrow v=12$ to $v=7 \rightarrow v=6$. It was noted by comparing the spectra at 77° K. with and without mercury, that the presence of mercury produced a shift in the spectral intensity distribution towards lower vibrational transitions. The addition of mercury was found to stabilize the discharge and minimize current power fluctuations. A laser output power at 20° C. as high as 14 w. corresponding to efficiency of 8.0 percent has been obtained.

The primary effect of the mercury is believed to have been the reduction in the average electron energy. The result of this is an enhancement of the excitation efficiency by increasing the electron density and bringing the peak of the electron distribution function closer to coincidence with the peaks of the electron excitation cross sections for $N_2$ and CO. Further improvement and efficiency was found when xenon was added to the gaseous mixture in the mercury containing laser device. At 20° C. the output of the laser increased to 25 w. corresponding to an efficiency of 16.5 percent with the xenon present. The amount of xenon that can be added to the gaseous mixture is 1.0 to 10.0 torr.

The particular advantage of the mercury electrodes in addition to providing increased efficiency at room temperature of the CO laser is that the mercury electrodes should have a lifetime considerably greater than conventional electrodes since the surface is being continuously renewed.

The embodiment of FIG. 1 involves a conventional laser design with axial flow of the gaseous through the laser. Additionally, as shown in FIG. 1 the discharge is axial between electrodes. FIG. 2 provides an embodiment wherein the discharge is transverse across the tube 45. In this embodiment a plurality of electrodes 47 which can be thin wires or similar elements are disposed along the tube 45, the electrodes being connected to a source not shown while the bottom portion of the tube contains a continuous pool of mercury 49.

The transverse discharge between the plurality of electrodes and the pool of mercury 49 provides for a high power operation of the laser. This is because the laser can operate at higher gas pressure since the gap between the electrode and mercury is smaller than when it is bridging the length as seen in FIG. 1. The higher pressure will provide better efficiency as well as the higher power output. Additionally, the higher pressure broadens the levels at which the laser operates. Further, more of mercury should go into the discharge. Another advantage of the arrangement is that the contamination of the mercury pool will be minimized as compared to the embodiment of FIG. 1 due to the large surface area of the mercury.

FIG. 3 discloses another arrangement for transverse operation of the laser. However, in this embodiment the gaseous mixture first picks up the mercury vapor and then is directed to a lasting region separate from the region containing the mercury. The device of FIG. 3 comprises a housing 61 having an inlet manifold 63 to which the gas is initially directed. From the manifold 63 the gas will pass through a region containing a plurality of electrodes 65 separated from a pool of mercury 67 in a manner similar to the arrangement shown in FIG. 2. In this region, the gaseous mixture will pick up the mercury vapor required to improve the efficiency of the operation of the device. The gas thus containing the mercury is then directed through a constricted throat area 69 which is in effect a venturi which serves to cool the gas to lower its kinetic temperature while maintaining high vibrational temperature. This is a well known technique that has been previously used in laser operation. After passing through the venturi the gas is then directed to a region 71 wherein lasing occurs between mirrors 73 and 75 respectively. After passing through the lasing region the gas is then directed to an outlet manifold 77.

FIG. 4 shows a further embodiment of the invention where a small housing 81 contains a pool of mercury 83. The enclosure 81 has an inlet 85 and an outlet 87 to which the gaseous mixture for the laser is directed. A first electrode 89 is disposed in the top of the housing while a second electrode 91 is located in the mercury bath 83. The electrodes are connected to a high voltage source 93. This provides a high voltage discharge in the small housing for capsule 81. The advantage of this device is that the excitation and transfer from the mercury occurs in a high-pressure region where electron and gas constituent densities are high. From the outlet 87 the gaseous mixture containing the mercury is then directed to a laser in which lasing will occur.

We claim:
1. A method of operating at room temperature a laser utilizing a gaseous mixture containing carbon monoxide comprising:
    discharging mercury vapor into the gaseous mixture,
    and lasing the carbon monoxide in the resultant gaseous mixture containing mercury.
2. The method of claim 1 comprising:
    discharging mercury vapor in a lasing region of a laser device.
3. The method of claim 2 comprising:
    providing a laser tube into which said gaseous mixture is directed, forming spaced electrodes of mercury in said tube,
    and discharging said mercury between said electrodes into said tube.
4. The method of claim 1 comprising:
    discharging the mercury vapor into the gaseous mixture prior to directing the mixture to a lasing region of a laser device.
5. The method of claim 1 further comprising:
    adding xenon to the gaseous mixture used in the laser.
6. A laser device comprising:
    a laser body having opposite reflective mirrors,
    means for directing a gaseous mixture containing carbon monoxide to said body,
    a source of mercury in said body,
    and means for causing mercury vapor to be discharged into said body to increase the room temperature efficiency of the lasing of the carbon monoxide in the resultant gaseous mixture.
7. The laser device of claim 6 wherein:
    the source of mercury comprises two separate pools of mercury spatially disposed in said body,
    and means for creating an electrical potential between the two pools sufficient to cause a discharge of mercury vapor into the body.
8. The laser device of claim 6 comprising:
    a continuous elongated pool of mercury disposed in the laser body,
    a plurality of separate electrode elements spatially disposed from said pool,
    and means for creating an electrical potential between the electrodes and said pool of mercury sufficient to cause a discharge of mercury vapor into the body.

* * * * *